United States Patent
Patel et al.

(10) Patent No.: US 10,606,497 B1
(45) Date of Patent: Mar. 31, 2020

(54) SYSTEMS AND METHODS FOR MANAGING REPLICATION PATH DIRECTION IN STORAGE NETWORKS

(71) Applicant: International Business Machines Corporation, Armonk, NY (US)

(72) Inventors: Sarvesh Patel, Pune (IN); Subhojit Roy, Pune (IN); Kushal Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/169,254

(22) Filed: Oct. 24, 2018

(51) Int. Cl.
  *G06F 3/06* (2006.01)
  *G06F 16/84* (2019.01)

(52) U.S. Cl.
  CPC ............ *G06F 3/0635* (2013.01); *G06F 3/065* (2013.01); *G06F 3/067* (2013.01); *G06F 3/0617* (2013.01); *G06F 3/0685* (2013.01); *G06F 16/84* (2019.01)

(58) Field of Classification Search
  CPC combination set(s) only.
  See application file for complete search history.

(56) References Cited

U.S. PATENT DOCUMENTS

| | | | |
|---|---|---|---|
| 2013/0339786 A1 | 12/2013 | Samanta et al. | |
| 2015/0095282 A1* | 4/2015 | Jones | H04L 67/1008 707/624 |
| 2015/0286436 A1* | 10/2015 | Olson | G06F 16/128 711/162 |
| 2015/0324255 A1* | 11/2015 | Kochunni | G06F 11/1448 711/162 |
| 2015/0326656 A1* | 11/2015 | Guo | H04L 67/1008 709/226 |
| 2016/0291890 A1 | 10/2016 | Jennas, II et al. | |
| 2017/0123939 A1 | 5/2017 | Maheshwari et al. | |
| 2017/0177264 A1* | 6/2017 | Liu | G06F 3/0613 |
| 2018/0052622 A1 | 2/2018 | Kalos et al. | |
| 2018/0129443 A1* | 5/2018 | Karve | G06F 3/0683 |

\* cited by examiner

*Primary Examiner* — Raymond N Phan
(74) *Attorney, Agent, or Firm* — Kunzler Bean & Adamson

(57) ABSTRACT

Methods and systems for enhanced performance during reduced network functioning are provided. A system may include a path detection module that detects a path change in a plurality of paths, the plurality of paths communicatively couple a host device to a plurality of volumes. Further, the data is replicated from a pre-change primary volume in the plurality of volumes to a post-change primary volume in the plurality of volumes. The system also includes a replication direction module that switches a direction of replication in response to the detected path change. Additionally, the data is replicated from the post-change primary volume to the pre-change primary volume in response to the detected path change. The system further includes an activity module that determines an activity level associated with one or more extents and arranges the one or more extents on the post-change primary volume in response to the detected path change.

20 Claims, 7 Drawing Sheets

SYSTEMS AND METHODS FOR MANAGING REPLICATION PATH DIRECTION IN STORAGE NETWORKS

FIELD

This invention relates to storage systems and more particularly relates to methods and systems for enhanced performance during reduced network functioning.

BACKGROUND

Storage systems typically store large amounts of data that may be used by hosts, clients, and/or servers. An effective storage system may provide high availability of the user data and may prevent data loss in case of disasters. Frequently, disaster recovery systems are used to back up copies of data and maintain the different copies at geographically separate locations. For example, when data is written to a primary volume located at a primary location the data may also be written to a secondary volume located at a secondary location. As the data on the primary volume and the secondary volume is kept in sync, if one of the volumes becomes inaccessible, a host device may access the data on the other volume. Thus, if a disaster strikes one storage location, data may be recovered from the other storage location.

SUMMARY

Methods and systems for enhanced performance during reduced network functioning are provided. A system enhancing performance during reduced network functioning includes a path detection module that detects a path change in a plurality of paths, the plurality of paths communicatively couple a host device to a plurality of volumes. Further, the data is replicated from a pre-change primary volume in the plurality of volumes to a post-change primary volume in the plurality of volumes. The system also includes a replication direction module that switches a direction of replication in response to the detected path change. Additionally, the data is replicated from the post-change primary volume to the pre-change primary volume in response to the detected path change. The system further includes an activity module that determines an activity level associated with one or more extents and arranges the one or more extents on the post-change primary volume in response to the detected path change.

In some embodiments, the pre-change primary volume and the post-change primary volume store data in a multi-tiered data storage that comprises one or more faster data tiers and one or more slower data tiers, wherein the one or more faster data tiers have faster access times than the one or more slower data tiers. Additionally, the activity module includes a data relocator module that relocates extents within the multi-tiered data storage based on the activity level associated with the one or more extents. Further, the data relocator module arranges high activity extents in the one or more extents in the one or more faster data tiers and low activity extents in the one or more extents in the one or more slower data tiers. Also, the data relocator module moves extents that have a high activity level due to read operations to the one or more faster data tiers. Moreover, the replication direction module switches the direction of replication after the data relocator module has relocated the extents with the multi-tiered data storage based on the activity level associated with the extents.

In further embodiments, the activity module maintains information about the activity level of the extents associated with a volume in at least one activity map associated with the volume. Additionally, the replication direction module includes an activity map exchange module that provides the at least one activity map associated with the pre-change primary volume to the post-change primary volume. Further, the activity map exchange module exchanges the at least one activity map using application program interface commands. Also, the activity map exchange module exchanges the at least one activity map in response to receiving an indication of the detected path change from the path detection module.

One method includes detecting a path change in a plurality of paths, the plurality of paths communicatively couple a host device to a plurality of volumes, wherein data is replicated from a pre-change primary volume in the plurality of volumes to a post-change primary volume in the plurality of volumes. The method also includes switching a direction of replication in response to the detected path change, wherein data is replicated from the post-change primary volume to the pre-change primary volume in response to the detected path change. Further, the method includes determining an activity level associated with one or more extents. Additionally, the method includes arranging the one or more extents on the post-change primary volume in response to the detected path change.

In certain embodiments, the pre-change primary volume and the post-change primary volume store data in a multi-tiered data storage that include one or more faster data tiers and one or more slower data tiers, wherein the one or more faster data tiers have faster access times than the one or more slower data tiers. Additionally, arranging the one or more extents includes relocating extents within the multi-tiered data storage based on the activity level associated with the one or more extents. Further, the method includes arranging high activity extents in the one or more extents in the one or more faster data tiers and low activity extents in the one or more extents in the one or more slower data tiers. Also, the method may further include moving extents that have a high activity level due to read operations data to the one or more faster data tiers. Moreover, the method includes switching the direction of replication after the data relocator module has relocated the extents with the multi-tiered data storage based on the activity level associated with the extents.

In further embodiments, the method includes maintaining information about the activity level of the extents associated with a volume in at least one activity map associated with the volume. Additionally, switching a direction of replication includes providing the at least one activity map associated with the pre-change primary volume to the post-change primary volume. Also, the method includes exchanging the at least one activity map using application program interface commands in response to receiving an indication of the detected path change from the path detection module.

Also, disclosed are computer program products including a computer-readable storage medium that include program instructions embodied therewithfor enhanced performance during reduced network functioning. Some program instructions executable by a processor cause the processor to detect a path change in a plurality of paths, the plurality of paths communicatively couple a host device to a plurality of volumes, wherein data is replicated from a pre-change primary volume in the plurality of volumes to a post-change primary volume in the plurality of volumes. Further, the program instructions cause the processor to switch a direction of replication in response to the detected path change, wherein data is replicated from the post-change primary volume to the pre-change primary volume in response to the detected path change. Also, the program instructions cause the processor to determine an activity level associated with one or more extents. Moreover, the program instructions cause the processor to arrange the one or more extents on the post-change primary volume in response to the detected path change.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
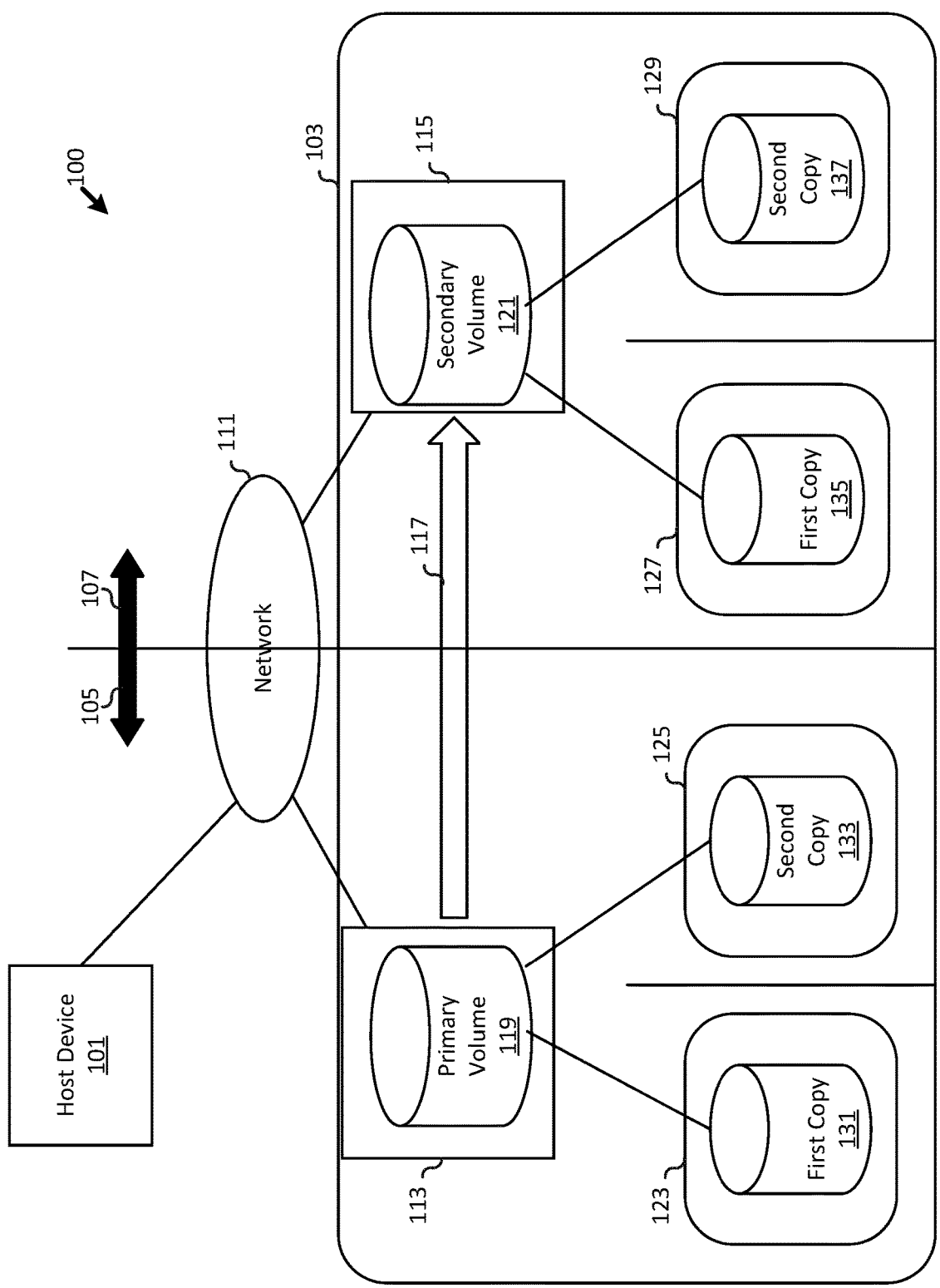
FIG. 1 is a block diagram of one embodiment of a computing system for replicating data on separate volumes.

Disclosed herein are various embodiments providing methods, systems, and computer program products that can provide enhanced performance during reduced network functioning. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

With reference now to the figures, FIG. 1 is a block diagram of one embodiment of a computing system 100 for replicating data on separate volumes. In certain implementations, the computing system 100 includes a host device 101. As used herein, the host device 101 may refer to a computing device that generates and consumes data. For example, the host device 101 may be a server, a supercomputer, a desktop computer, a laptop computer, a smart phone, a sensor, a smart car, a home automation device, or other device capable of generating and/or consuming data. In some implementations, the host device 101 may provide data to and acquire data from a storage system 103. Further, the host device 101 may include multiple electronic devices that communicate with the storage system 103.

To facilitate the transmission of information between the host device 101 and the storage system 103, the host device 101 may be connected to the storage system 103 through a network 111. The network 111 may be a storage area network (SAN), an extended SAN, a wide area network, a local area network, or combination of multiple network types. Further, the network 111 information may be transmitted through the network via wireless terminals, fiber optic cable, coaxial cable, ethernet, telephone lines, and the like.

In certain embodiments, the storage system 103 may be configured to store data from one or more devices, such as the host device 101 and other computing devices capable of consuming and producing data. In certain embodiments, the storage system 103 may store the data such that the data is replicated at the multiple sites. For example, the storage system 103 may include a first site 105 and a second site 107. Data produced by the host device 101 and other devices in communication with the storage system 103 may be replicated on the first site 105 and the second site 107 using configurations such as Hyperswap or other replicating relationships. In certain embodiments, the first site 105 and the second site 107 may be separated by a large distance such that a natural disaster or other situation that could potentially affect the operational ability of one of the first site 105 and the second site 107 would likely not affect both of the first site 105 and the second site 107. Accordingly, in the event of a disaster, data stored at one of the sites would likely be available for use by the host device 101.

In some embodiments, the storage system 103 may include separate site controllers at each site. For example, the first site 105 may include a first site controller 113 and a second site controller 115. The first site controller 113 and the second site controller 115 may receive data from the host device 101 and direct the storage of data within memory storage devices located at the associated site. For example, the first site controller 113 and the second site controller 115 may include a processor that aids in directing the storage of data within the memory storage. In some embodiments, the processor may be a device capable of processing computer executable instructions and communicating with other devices as directed by the executable instructions.

In further embodiments, the memory storage devices may include any suitable type of storage device or cluster of storage devices that are known or developed in the future that can store computer-usable data. In various embodiments, the memory storage devices may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection as directed by the respective site controller.

In certain embodiments, memory storage may be implemented as a direct-access storage devices (DASD). The memory storage, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, the memory storage devices may include a cluster of separate storage devices that are configured to store data. For example, the memory storage may be a network file system, a parallel file system, or other type of file system where multiple computing devices access the memory storage.

In various embodiments, the memory storage may include non-volatile/persistent hardware and/or software configured to perform long-term data storage operations, including, but not limited to, data archiving, data backup, data mirroring, replicating data, etc. For instance, the memory storage may include non-volatile and/or persistent hardware and/or software to perform long-term data storage operations, which may include write operations, read operations, read-write operations, etc., among other operations.

In some embodiments, the first site controller 113 may control the saving of data at a primary volume 119 and the second site controller 115 may control the saving of data at a secondary volume 121. The first site controller 113 and the second site controller 115 may communicate with one another such that data stored on the primary volume 119 is mirrored on the secondary volume 121 along the direction of replication 117. As used herein, data that is mirrored on different volumes refers to data that is stored on the primary volume 119 and then replicated on a secondary volume 121 along the direction of replication 117. For example, the data may be replicated between the primary volume 119 and the secondary volume 121 synchronously, such as in a metro mirror configuration. In a metro mirror configuration, data from the host device 101 may be written to the primary volume 119, and the first site controller 113 synchronously transfers the data from the primary volume 119 to the second site controller 115, which stores the data on the secondary volume 121. When the primary volume 119 and the secondary volume 121 store the same copies of the data, one of the first site controller 113 or the second site controller 115 may provide a notification to the host device 101 that the data is stored on both the primary volume 119 and the secondary volume 121. Alternatively, the data may be replicated between the primary volume 119 and the secondary volume 121 asynchronously, such as in a global mirror configuration. In a global mirror configuration, data from the host device 101 may be written to the primary volume 119 and then asynchronously transferred by the first site controller 113 to the second site controller 115 for storage in the secondary volume 121.

In further embodiments, a site may have separate storage locations at a site that also stores replicated copies of the data. For example, the first site controller 113 may store replicated data on the primary volume 119 at two different locations or rooms located at the first site 105. The first site controller 113 may store a first copy 131 of the data in a first room and a second copy 133 of the data in a second room. To store the data in the separate rooms, the first site controller 113 may communicate with memory controllers associated with each room. As used herein, the memory controllers may control the storage of data within an arrangement of storage devices. For example, the first site controller 113 may receive an I/O request from the host device 101 and then communicate with a memory controller 123 to access or write data in the first copy 131 located at the first room. When the first site controller 113 receives a write request from the host device 101, the first site controller 113 may pass the data to be written to both the memory controller 123 associated with the first copy 131 and the memory controller 125 associated with the second copy 133. The first site controller 113 may then transmit the data to the second site controller 115 for replication on the secondary volume 121.

In a similar manner, the second site controller 115 may store replicated data on the secondary volume 121 at two different locations or rooms located at the second site 107. The second site controller 115 may likewise store a first copy 135 of the data in a first room and a second copy 137 of the data in a second room. In a similar manner, the second site controller 115 may communicate with memory controllers associated with each room. For example, the second site controller 115 may receive a write request from the first site controller 113. The second site controller 115 may then pass the data to be written to both the memory controller 127 associated with the first copy 135 and the memory controller 129 associated with the second copy 137. The first copy 135 and the second copy 137 may then store replicated copies of the data that is also stored on the first copy 131 and the second copy 133 of the primary volume 119.

Figure 2:
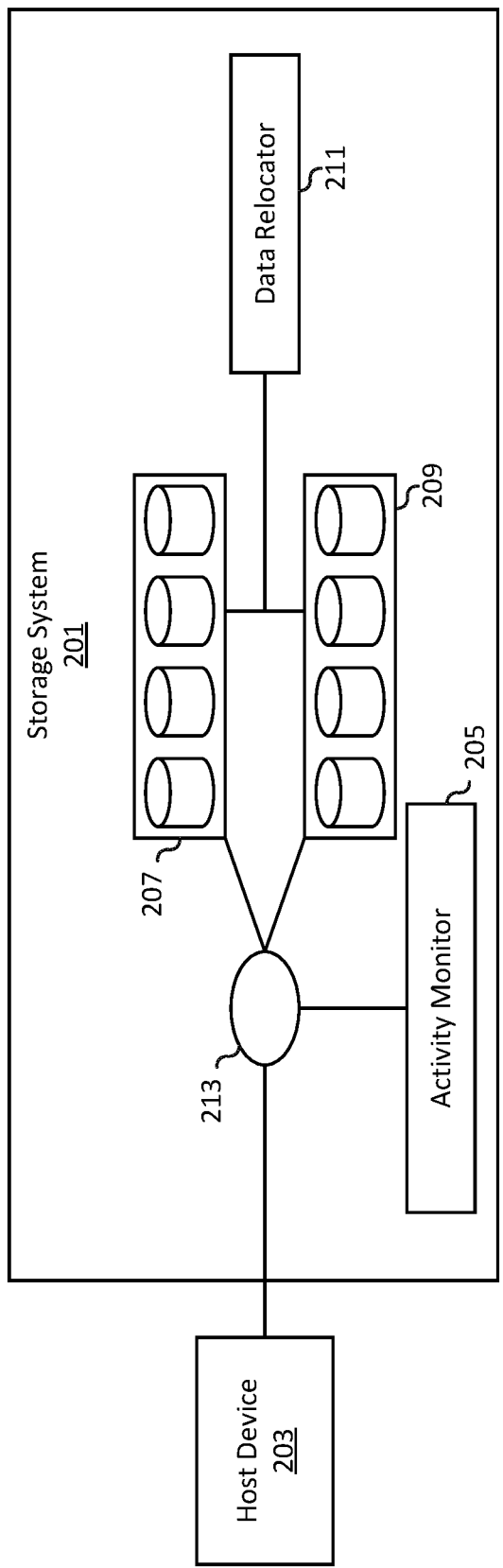
FIG. 2 is a block diagram illustrating one embodiment of a storage system.

As illustrated, FIG. 2 is a block diagram of a storage system 201 in communication with a host device 203. As shown, the host device 203 may function in a similar manner to the host device 101 described above with respect to FIG. 1. As described herein, the host device 203 may transmit data to and receive data from the storage system 201. Also, the host device 203 may transmit data to and receive data from multiple storage systems 201. The storage system 201 may function similarly to the primary volume 119 or the secondary volume 121, where a site controller controls the storage of data for a site, such as the first site controller 113 or the second site controller 115. Alternatively, the storage system 201 may control the storage of data for a portion of memory at a site. For example, the storage system 201 may be similar to one of the memory controllers 123, 125, 127, and 129. Accordingly, each of the first copies 131 and 135 and the second copies 133 and 137 may be implemented as a storage system 201. Further, one of the memory controllers 123, 125, 127, and 129 may control multiple storage systems 201.

As illustrated, a storage system 201 may be a multi-tiered data storage that includes different memory tiers. In particular, the storage system 201 may include a first memory tier 207 and a second memory tier 209. As used herein, a memory tier may refer to a group of memory storage elements that are associated with one another based on the characteristics of the memory storage elements. For example, the memory storage elements may be grouped together based on similar configuration, type of memory, memory transfer speeds, accessibility of the data, and the like. In some exemplary embodiments, data may be read or written to the first memory tier 207 faster than data that is read or written to the second memory tier 209. Accordingly, the first memory tier 207 may be a faster memory tier and the second memory tier 209 may be a slower memory tier in relation to the first memory tier 207.

In some embodiments, when data is transferred between the storage system 201 and the host device 203, the storage system 201 may attempt to store memory extents that are associated with data that is accessed with higher frequency in faster memory tiers. For example, if the first memory tier 207 is faster than the second memory tier 209, the storage system 201 may store extents that are accessed with greater frequency in the first memory tier 207. In certain embodiments, the storage system 201 may include an activity monitor 205 that is configured to monitor the activity levels of memory extents that are communicated between the host device 203 and the storage system 201. In some embodiments, the activity monitor 205 may be a process that executes in the background such as a daemon. For example, the host device 101 may provide a write request to a particular extent and the activity monitor 205 may determine that this is the first time that this particular extent is accessed. Accordingly, the activity monitor 205 may determine that the extent associated with the write request has a low activity level and is accordingly stored in the slower or second memory tier 209. Conversely, the host device 203 may provide a read request to a particular extent and the activity monitor 205 may determine that the extent associated with the read request is accessed frequently. Accordingly, the activity monitor 205 may determine that the extent associated with the read request is a high activity read request and should be stored on the faster or first memory tier 207. When the activity monitor 205 determines an activity level for a particular extent, the activity monitor 205 may communicate with a switch 213. The switch 213 uses the information from the activity monitor 205 to determine which of the first memory tier 207 and the second memory tier 209 currently stores the data.

In some embodiments, the storage system 201 may include a data relocator 211. The data relocator 211 may acquire activity level information from the activity monitor 205 and determine whether the activity level information for the extents in the first memory tier 207 and the second memory tier 209 matches the extents stored in the first memory tier 207 and the second memory tier 209. If the activity level information does not match the extents in the first memory tier 207 and the second memory tier 209, the data relocator 211 may relocate the extents such that the extents stored on the first memory tier 207 and the second memory tier 209 match the activity level information. For example, the activity level information may include a heat map, where the heat map is a mapping that associates the different extents with heat levels. The activity monitor 205 may provide the heat map to the data relocator 211, which then may generate a volume migration plan so the extents having a higher activity level are located in the faster tiers, such as the first memory tier 207. The data relocator 211 may then relocate the extents among the different tiers based on the heat map information.

Figure 3:
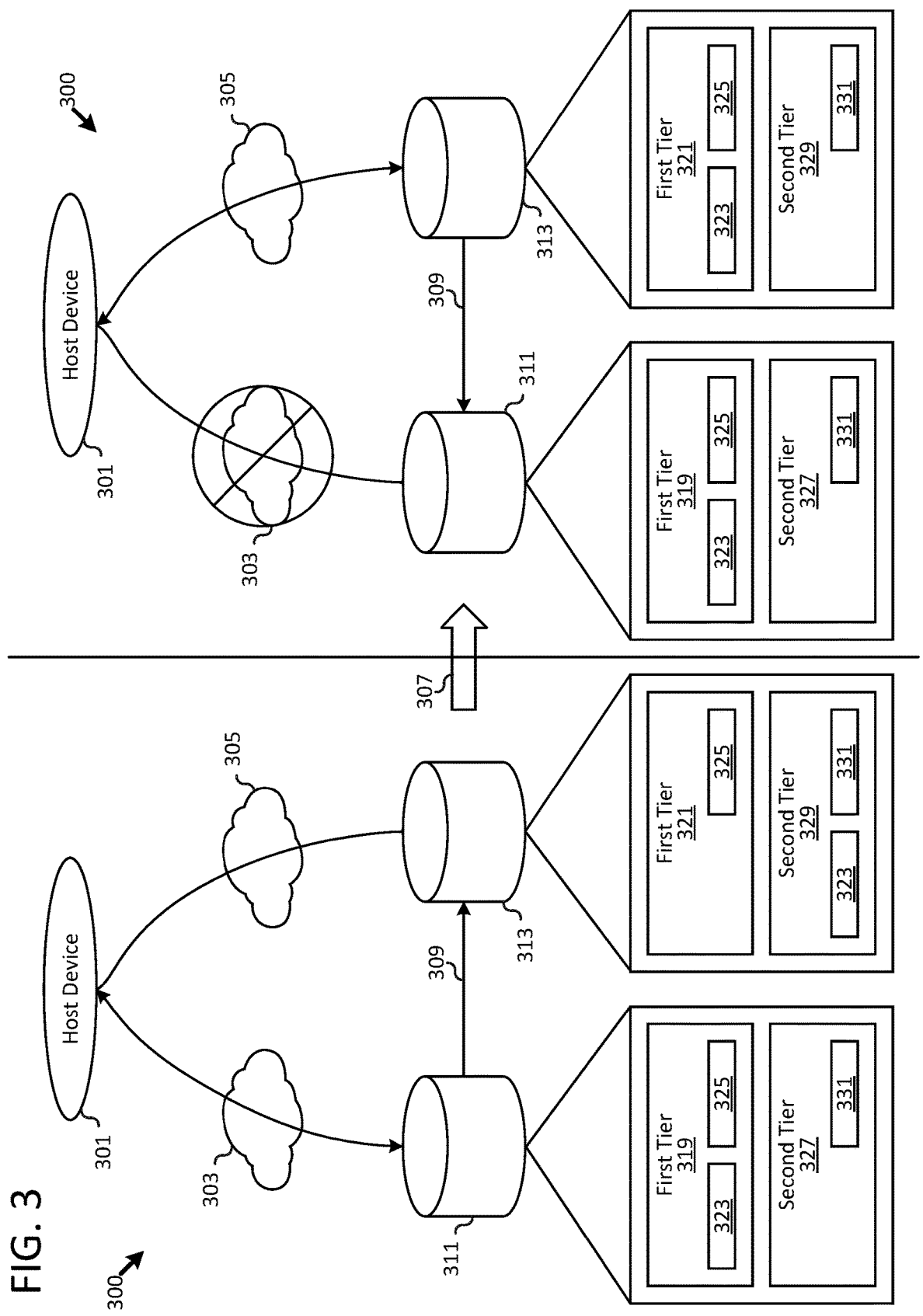
FIG. 3 is a block diagram illustrating one embodiment of a direction of replication switching between separate volumes.

FIG. 3 is a block diagram illustrating an exemplary situation of the switching of the direction of replication 309 between separate volumes that store replicated data in a computing system 300. As shown, the computing system 300 may include a host device 301 that may function in a similar manner to the host device 101 described above with respect to FIG. 1 and the host device 203 described above with respect to FIG. 2. As described herein, the host device 301 may transmit data to and receive data from a pre-change primary volume 311, which in turn replicates changes made to the data stored on the pre-change primary volume 311 on the post-change primary volume 313 in accordance with the direction of replication 309. As used herein, the pre-change primary volume 311 is the primary volume and the post-change primary volume 313 is the secondary volume before a change 307 in the direction of replication 309. After a change in the direction of replication 309, the post-change primary volume 313 is the primary volume and the pre-change primary volume 311 is the secondary volume.

In further embodiments, the pre-change primary volume 311 and the post-change primary volume 313 may be multi-tiered storage systems such as the storage system 201 described above in relation to FIG. 2. For example, the pre-change primary volume 311 may include a first tier 319 and a second tier 327. Also, the post-change primary volume 313 may include a first tier 321 and a second tier 329. As shown, each of the pre-change primary volume 311 and the post-change primary volume 313 stores a first extent 323, a second extent 325, and a third extent 331. The different extents may be arranged amongst the first tiers 319 and 321 and the second tiers 327 and 329 based on the activity level of the different extents.

In some embodiments, the host device 301 communicates with one of the pre-change primary volumes 311 and the post-change primary volume 313 through one or more network paths. For example, the host device 301 may communicate with the pre-change primary volume 311 through a first network path 303 and with the post-change primary volume 313 through a second network path 305. As described herein, the first network path 303 and the second network path 305 may be part of a network that is similar to the network 111 described above with respect to FIG. 1, where the first network path 303 and the second network path 305 communicate information to different locations connected within the network. For example, when the pre-change primary volume 311 is located at a first site, such as the first site 105 in FIG. 1, and the post-change primary volume 313 is located at a second site, such as the second site 107 in FIG. 1. The first network path 303 may connect the host device 301 to the pre-change primary volume 311 located at the first site and the second network path 305 may connect the host device 301 to the post-change primary volume 313. Further, the pre-change primary volume 311 may communicate with the post-change primary volume 313 through the network along the direction of replication 309.

In further embodiments, before the change 307, extents may be stored in different locations on the different volumes. For example, the first tier 319 of the pre-change primary volume 311 may store the first extent 323 and the second extent 325 on the first tier 319 and the third extent 331 on the second tier 327. In contrast, the post-change primary volume 313 may store the first extent 323 and the third extent 331 on the second tier 329 and the second extent 325 on the first tier 321. In certain embodiments, the first extent 323 may be stored on the first tier 319 by the pre-change primary volume 311 and on the second tier 329 by the post-change primary volume 313. An extent may become stored on the different tiers when the host device 301 accesses the first extent 323 more frequently through the pre-change primary volume 311 than the first extent 323 is accessed through the post-change primary volume 313 and the accesses through the post-change primary volume 313 is less than an. For example, the host device 301 may be reading data from the first extent 323, as the data is not changed within the first extent 323, the file operation is not replicated on the post-change primary volume 313. Accordingly, the activity monitor 205 associated with the post-change primary volume 313 may fail to detect that the first extent 323 has been accessed by the host device 301.

In certain embodiments, the first network path 303 from the host device 301 to the pre-change primary volume 311 may become unavailable or experience reduced network functioning, such that the host device 301 is unable to communicate with the pre-change primary volume 311, however, the pre-change primary volume 311 may be able to communicate with the post-change primary volume 313. When the host device 301 is unable to communicate with the pre-change primary volume 311, the host device 301 may attempt to communicate with the post-change primary volume 313 through the second network path 305. When the host device 101 switches paths, the computing system 300 may detect the path change. When the computing system 300 detects the path change, the pre-change primary volume 311 may provide an activity level map for the extents on the pre-change primary volume 311 to the post-change primary volume 313. The post-change primary volume 313 may then migrate extents in the post-change primary volume 313 in accordance with the received activity level map. For example, the first tier 321 may store the first extent 323 and the second extent 325, while the second tier 329 may store the third extent 331 to match the storage of extents in the pre-change primary volume 311. When the storage of extents on the post-change primary volume 313 match the storage of extents on the pre-change primary volume 311, the direction of replication 309 may change such that changes made to the data stored on the post-change primary volume 313 are replicated on the pre-change primary volume 311. Accordingly, the most frequently accessed extents by the host device 301 may be readily accessible by the host device 301 through the post-change primary volume 313.

Figure 4:
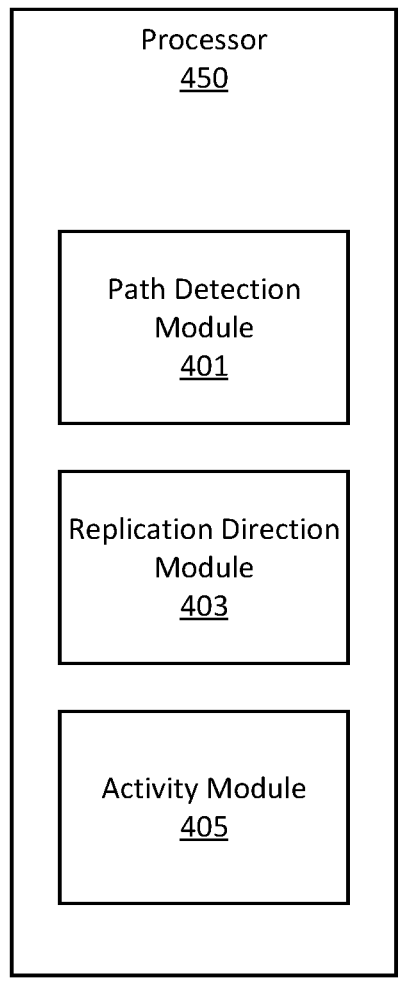
FIG. 4 is a block diagram illustrating an embodiment of a processor configured to provide enhanced performance during reduced network functioning.

FIG. 4 is a block diagram illustrating an embodiment of a processor 450 for providing enhanced performance during reduced network functioning. In certain embodiments, as used herein, the processor 450 may be a general-purpose computer, special-purpose computer, multiple processors, or other programmable data processing apparatus. In some embodiments, the processor 450 may be one or more processors on the storage system 201 capable of directing the storage of data on storage devices such as those described above in connection with FIGS. 2 and 3. For example, the processor 450 may be part of the activity monitor 205 and/or the data relocator 211. In the depicted embodiment, the processor 450 may include a path detection module 401, a replication direction module 403, and an activity module 405. As described herein, the path detection module 401 may detect a path change in a plurality of paths that couple a host device 301 to a plurality of volumes. Further, as described herein, the replication direction module 403 may switch a direction of replication 309 between a pre-change primary volume 311 and a post-change primary volume 313 in response to the detected path change. Also, as described herein the activity module 405 may determine an activity level associated with extents and arrange the extents on the post-change primary volume 313 in response to the detected path change.

In certain embodiments, the path detection module 401 may detect a path change in the plurality of paths that couple a host device such as host device 301 to multiple volumes such as the pre-change primary volume 311 and the post-change primary volume 313. As discussed above, a host device 301 may be connected to both of a pre-change primary volume 311 and a post-change primary volume 313, however, the host device 301 may communicate input/output requests to one of the pre-change primary volume 311 and the post-change primary volume 313. For example, the host device 301 may communicate input/output requests with the pre-change primary volume 311. The pre-change primary volume 311 may provide replicated input/output requests that change the data on the pre-change primary volume 311 on other volumes, such as the post-change primary volume 313.

In some embodiments, the path connecting the host device 301 to a pre-change primary volume 311 may experience reduced function. For example, the network path that connects the host device 301 to the pre-change primary volume 311 may become disconnected, have reduced network speeds, or have other reduced network functioning. When a path experiences reduced network functioning, the host device 301 may become unable to satisfactorily acquire data from the pre-change primary volume 311 and may attempt to connect to other volumes through other network paths. For example, the host device 301 may connect to the post-change primary volume 313 to acquire the data that was replicated from the pre-change primary volume 311 to the post-change primary volume 313. When the host device 301 changes the path to acquire the data, the path detection module 401 may detect that a path change has occurred.

In certain embodiments, the path detection module 401 may detect which volume is the primary volume by detecting which path connecting the host device 301 to one of the volumes receives the most input/output requests. In at least one implementation, the path detection module 401 may check for the path being used by the host device 301 to communicate with the volumes at periodic time intervals. Alternatively, the path detection module 401 may check when the host device 301 provides an input/output request to the volumes.

In certain embodiments, the replication direction module 403 may switch a direction of replication 309 in response to a detected path change. When a path from the host device 301 to the pre-change primary volume 311 experiences reduced functioning, the pre-change primary volume 311 and the post-change primary volume 313 may still be in an active-active relationship such that the pre-change primary volume 311 is able to communicate with the post-change primary volume 313. For example, the path detection module 401 may provide a path change indication to the replication direction module 403. In response to receiving the path change indication, the path detection module 401 may switch the direction of replication. For example, the replication direction module 403 may switch the direction of replication 309 such that changes to data made on the post-change primary volume 313 are replicated on the pre-change primary volume 311. In some embodiments, the replication direction module 403 may communicate the changes made to the post-change primary volume 313 to the pre-change primary volume 311.

In some embodiments, the activity module 405 may determine an activity level associated with one or more extents and then arranges the extents on the post-change primary volume 313 in response to the detected path change. For example, the activity module 405 may maintain information about the activity level of the extents associated with a volume. In certain embodiments, the activity module 405 may maintain the information about the activity level of the extents in an activity map associated with the volume. For example, the activity map may be a heat map or other type of mapping for indicating the activity level of a particular extent. As described above, an activity level for an extent may indicate how often a particular extent on a volume is associated with an input/output request from one or more hosts.

In certain embodiments, in response to the detected path change, the activity module 405 may cause a controller for the pre-change primary volume 311 to provide the activity level information associated with the pre-change primary volume 311 to a controller for the post-change primary volume 313. In some embodiments, upon reception of the activity level information by the post-change primary volume 313, the post-change primary volume 313 may form a migration plan for migrating extents to match the activity levels of the extents on the pre-change primary volume 311. The activity module 405 may then migrate the extents on the post-change primary volume 313 as dictated by the activity level information.

In further embodiments, the replication direction module 403 switches the replication of direction upon completion of the migrations of the extents on the post-change primary volume 313 after receiving the activity level information from the pre-change primary volume 311. Accordingly, the frequently accessed extents by the host device 301 may be readily accessible by the host device 301 through the post-change primary volume 313.

Figure 5:
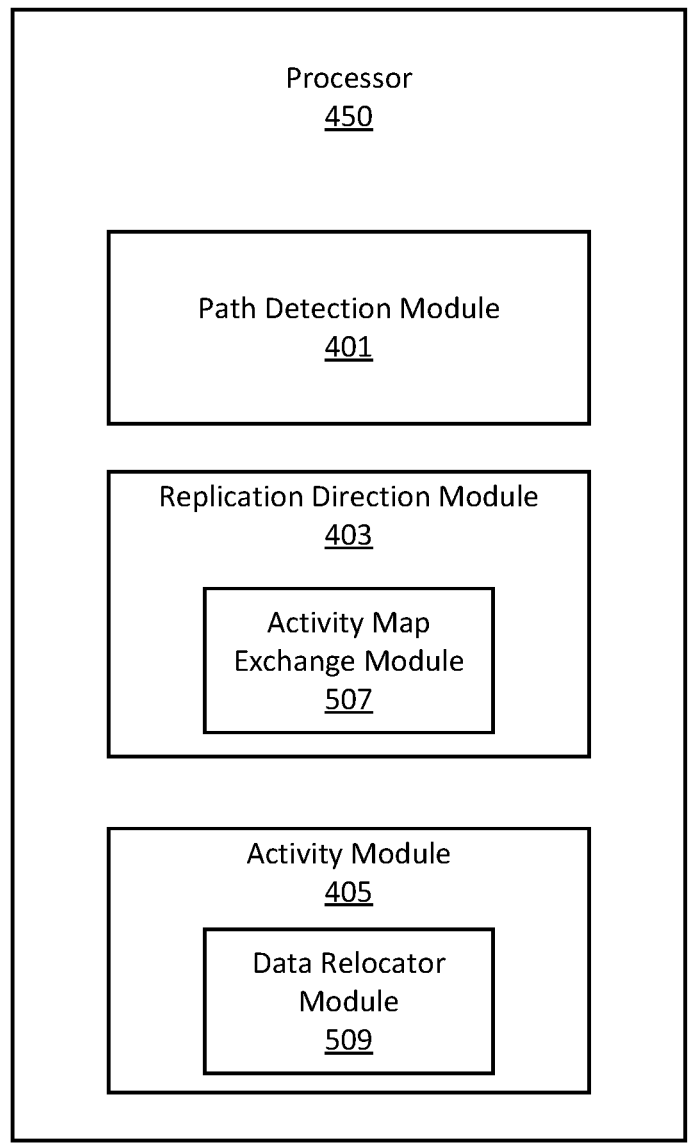
FIG. 5 is a block diagram illustrating a further embodiment of a processor configured to provide enhanced performance during reduced network functioning.

FIG. 5 is a block diagram illustrating a further embodiment of a processor 450 for providing enhanced performance during reduced network functioning. The processor 450, in various embodiments, may be substantially similar to the processor 450 described above with regards to FIG. 4. In the depicted embodiment, the processor 450 may include a path detection module 401, a replication direction module 403, and an activity module 405, which may be configured substantially similar as described above with regards to the path detection module 401, the replication direction module 403, and the activity module 405 of FIG. 4. Additionally, the replication direction module 403 may include an activity map exchange module 507. As described herein, the activity map exchange module 507 may provide an activity map associated with a pre-change primary volume 311 to a post-change primary volume 313. Further, the activity module 405 may include a data relocator module 509. As described herein, the data relocator module 509 may relocate extents within a multi-tiered data storage based on the activity level of a particular extent.

In certain embodiments, the activity map exchange module 507 may respond to an indication of a detected path change by providing the activity map for the pre-change primary volume 311 to the post-change primary volume 313. For example, the activity map exchange module 507 may send application program interface (API) commands to a controller for the pre-change primary volume 311 that direct the controller to send an activity map to one or more other volumes in communication with the host device 301. When the controller for the pre-change primary volume 311 receives the API commands, the controller may then transmit the activity map to the other volumes in communication with the host. In an alternative embodiment, the activity map exchange module 507 may send the API commands to the controller for the post-change primary volume 313 that direct the controller for the post-change primary volume 313 to request the activity map from the pre-change primary volume 311. In response to the request, the pre-change primary volume 311 may transmit the activity map to the post-change primary volume 313.

In further embodiments, the data relocator module 509 may relocate extents within a multi-tiered data storage, such as the multi-tiered data storage described above with respect to FIG. 2. In at least one embodiment, the data relocator module 509 may relocate extents based on the activity level associated with the one or more extents. For example, as described above, an activity level may indicate how often a particular extent is associated with a particular input/output request. For example, an extent that is frequently written to or read from may be located in a faster data tier than an extent that is seldomly written to or read from. Accordingly, data that used more often is more readily available.

In some embodiments, an extent may be located on different data tiers on separate volumes. For example, the host device 301 may frequently read data from an extent located on the faster data tier of the pre-change primary volume 311. As the data does not change on the pre-change primary volume 311, the data will not be subject to an input/output request on the post-change primary volume 313 and may be located in the slower data tier of the post-change primary volume 313. However, if the host device 301 writes data to an extent located on the faster data tier of the pre-change primary volume 311, the data changes will be replicated on the extent on the post-change primary volume 313. Accordingly, as the data is accessed on the post-change primary volume 313, the extent associated with the data may be located on the faster data tier of the post-change primary volume 313. However, if the host device 301 begins accessing data from the post-change primary volume 313, the host device 301 may experience a decline in performance as reads of data associated with extents in the pre-change primary volume 311 may be located on the slower data tier on the post-change primary volume 313.

In certain embodiments, to improve performance after the host device 301 begins accessing data on the post-change primary volume 313, the activity map exchange module 507 may provide the activity level information to the post-change primary volume 313. The data relocator module 509 may use the acquired activity level information to migrate the extents on the post-change primary volume 313 to match the organization of the extents as described by the activity level information. For example, the data relocator module 509 may identify extents in the slower data tiers of the post-change primary volume 313 and migrate the extents to be in the faster data tiers. In some embodiments, the data pa relocator module 509 may determine whether extents in the faster and slower data tiers are stored in memory due to read operations and/or write operations. Also, the data relocator module 509 may maintain extents in the faster data tiers due to write operations in the faster data tiers. Conversely, if an extent was stored in the faster data tier due to read operations on the pre-change primary volume 311, the data relocator module 509 may determine if the extent is in the slower data tier on the post-change primary volume 313. If the extent is in the slower data tier on the post-change primary volume 313, the data relocator module 509 may relocate the extent to the faster data tier on the post-change primary volume 313 according to the activity level information for the extent.

In further embodiments, after the data relocator module 509 has relocated the extents to the data tiers indicated by the activity level information, the data relocator module 509 may provide an indication that the relocation of data is complete for the post-change primary volume 313, the replication direction module 403 may switch the direction of replication, such that changes made to the post-change primary volume 313 are replicated on the pre-change primary volume 311. Accordingly, the data that is frequently accessed may be located in a faster data tier when the host device 301 switches paths between the pre-change primary volume 311 and the post-change primary volume 313.

Figure 6:
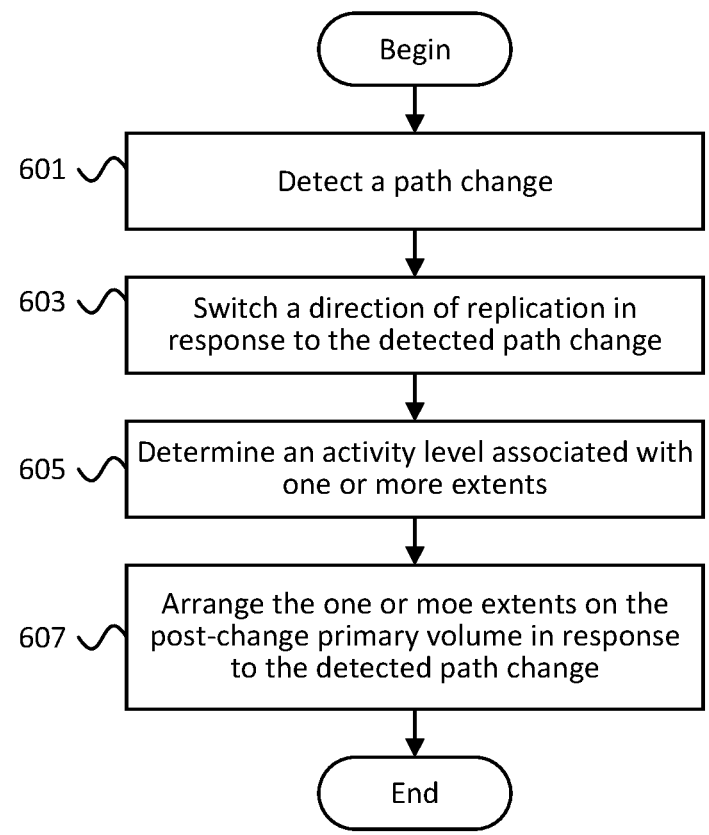
FIG. 6 is a flowchart diagram illustrating one embodiment of a method for providing enhanced performance during reduced network functioning.

FIG. 6 is a flow chart diagram illustrating one embodiment of a method 600 for providing enhanced performance during reduced network functioning. In some embodiments, the method 600 begins at 601, where a path change is detected. As discussed above, a host device 301 may be writing data to a pre-change primary volume 311 and data written to the pre-change primary volume 311 may be replicated on a post-change primary volume 313. If the pre-change primary volume 311 becomes unavailable, the path used by the host device 301 to communicate with the pre-change primary volume 311 may change such that the host device 301 writes data to the post-change primary volume 313. For example, the path detection module 401 may detect that the path has changed. Further, the method 600 proceeds at 603, where a direction of replication 309 is switched in response to the detected path change. For example, after the path change, a host device 301 may be writing data to the post-change primary volume 313. To maintain synchronization of the data on the pre-change primary volume 311 with the data on the post-change primary volume 313, the direction of replication 309 may be switched, such that data operations to the post-change primary volume 313 may be replicated on the pre-change primary volume 311.

In additional embodiments, the method 600 proceeds at 605, where an activity level associated with one or more extents may be determined. For example, an activity monitor 205 may monitor the input/output requests associated with the different extents. Based on the input/output requests, the activity monitor 205 may maintain a activity level map (such as a heat map) for each of the pre-change primary volume 311 and the post-change primary volume 313, where the activity level map provides the activity levels of the different extents. Additionally, the method 600 may proceed at 607, where the one or more extents on the post-change primary volume 313 may be arranged in response to the detected path change. For example, the pre-change primary volume 311 may provide activity level information for the pre-change primary volume 311 to the post-change primary volume 313 in response to the detected path change. When the post-change primary volume 313 receives the activity level information from the pre-change primary volume 311, the post-change primary volume 313 may create and execute an extent migration plan such that the extents are arranged on the post-change primary volume 313 based on the activity level information from the pre-change primary volume 311. In some embodiments, the direction of replication 309 is not switched until the extents are arranged on the post-change primary volume 313 as indicated by the activity level information for the pre-change primary volume 311. The method 600 then ends.

Figure 7:
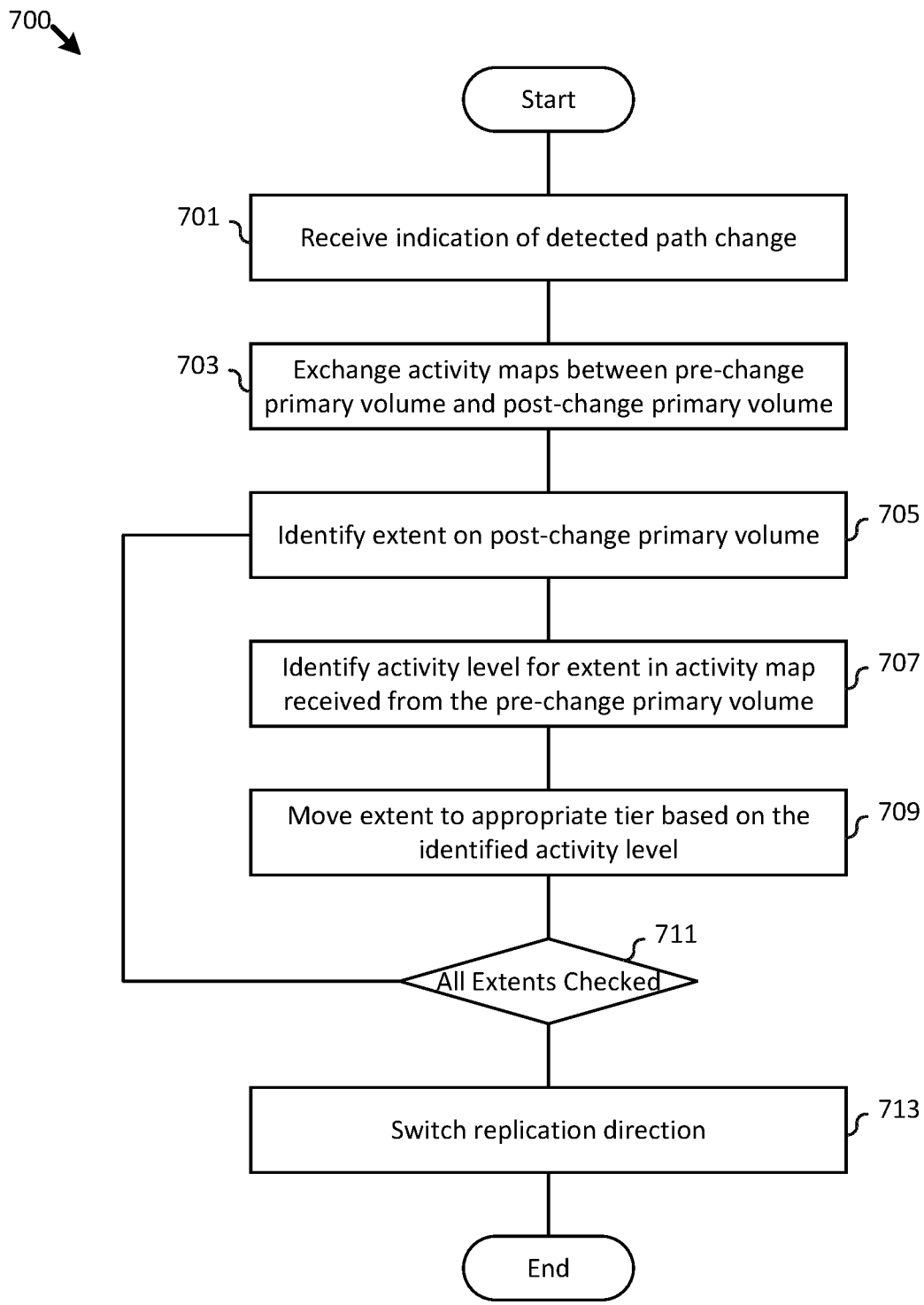
FIG. 7 is a flowchart diagram illustrating an embodiment of a further method for providing enhanced performance during reduced network functioning.

FIG. 7 is a flow chart diagram illustrating a further embodiment of a method 700 for providing enhanced performance during reduced network functioning. Method 700 proceeds at 701 where an indication is received of a detected path change. For example, the input/output requests made to the different volumes may be monitored. The path change may be detected when the volume being associated with the most input/output requests changes such that a different volume is associated with the most input/output requests. When the change is detected, either by a volume or a controller monitoring the volumes, the volume or controller detecting the change may provide an indication to other devices and volumes associated with the storage. Method 700 then proceeds to 703, where activity maps are exchanged between a pre-change primary volume 311 and a post-change primary volume 313. For example, the pre-change primary volume 311 may provide the associated activity map to the post-change primary volume 313.

In certain embodiments, the method 700 proceeds at 705, where an extent on the post-change primary volume 313 is identified. Method 700 then proceeds at 707, where an activity level in the activity map received from the pre-change primary volume 311 may be identified for the extent. Method 700 may then proceed at 709, where the extent may be moved to the appropriate tier based on the identified activity level. For example, if the extent is in a slower tier on the post-change primary volume 313, and the activity map received from the pre-change primary volume 311 indicates that the extent is in the faster tier, the post-change primary volume 313 or a controller of the post-change primary volume 313 may move the extent into the faster tier. Further, method 700 proceeds at 711, where it is determined whether all extents have been checked. For example, if there are further extents to compare against the received activity map, the method 700 returns to 705. However, if there are no further extents to check, the method 700 proceeds at 713, where a replication direction is switched. For example, before the detected path change, data changes made to the pre-change primary volume 311 would be replicated on the post-change primary volume 313. After the detected change and migration of the appropriate extents, the direction of replication 309 may be switched such that the data changes made to the post-change primary volume 313 would be replicated on the pre-change primary volume 311. Method 700 then ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a path detection module that detects a path change in a plurality of paths, the plurality of paths communicatively couple a host device to a plurality of volumes, wherein data is replicated from a pre-change primary volume in the plurality of volumes to a post-change primary volume in the plurality of volumes;
   a replication direction module that switches a direction of replication in response to the detected path change, wherein data is replicated from the post-change primary volume to the pre-change primary volume in response to the detected path change; and
   an activity module that determines an activity level associated with one or more extents and arranges the one or more extents on the post-change primary volume in response to the detected path change.

2. The system of claim 1, wherein the pre-change primary volume and the post-change primary volume store data in a multi-tiered data storage that comprises one or more faster data tiers and one or more slower data tiers, wherein the one or more faster data tiers have faster access times than the one or more slower data tiers.

3. The system of claim 1, wherein the activity module maintains information about the activity level of the extents associated with a volume in at least one activity map associated with the volume.

4. The system of claim 2, wherein the activity module comprises a data relocator module that relocates extents within the multi-tiered data storage based on the activity level associated with the one or more extents.

5. The system of claim 3, wherein the replication direction module comprises an activity map exchange module that provides the at least one activity map associated with the pre-change primary volume to the post-change primary volume.

6. The system of claim 5, wherein the activity map exchange module exchanges the at least one activity map using application program interface commands.

7. The system of claim 4, wherein the data relocator module arranges high activity extents in the one or more extents in the one or more faster data tiers and low activity extents in the one or more extents in the one or more slower data tiers.

8. The system of claim 4, wherein the replication direction module switches the direction of replication after the data relocator module has relocated the extents with the multi-tiered data storage based on the activity level associated with the extents.

9. The system of claim 7, wherein the data relocator module moves extents that have a high activity level due to read operations to the one or more faster data tiers.

10. The system of claim 5, wherein the activity map exchange module exchanges the at least one activity map in response to receiving an indication of the detected path change from the path detection module.

11. A method comprising:
    detecting a path change in a plurality of paths, the plurality of paths communicatively couple a host device to a plurality of volumes, wherein data is replicated from a pre-change primary volume in the plurality of volumes to a post-change primary volume in the plurality of volumes;
    switching a direction of replication in response to the detected path change, wherein data is replicated from the post-change primary volume to the pre-change primary volume in response to the detected path change;
    determining an activity level associated with one or more extents; and
    arranging the one or more extents on the post-change primary volume in response to the detected path change.

12. The method of claim 11, further comprising maintaining information about the activity level of the extents associated with a volume in at least one activity map associated with the volume.

13. The method of claim 11, wherein the pre-change primary volume and the post-change primary volume store data in a multi-tiered data storage that comprises one or more faster data tiers and one or more slower data tiers, wherein the one or more faster data tiers have faster access times than the one or more slower data tiers.

14. The method of claim 12, wherein switching a direction of replication comprises providing the at least one activity map associated with the pre-change primary volume to the post-change primary volume.

15. The method of claim 14, further comprising exchanging the at least one activity map using application program interface commands in response to receiving an indication of the detected path change from the path detection module.

16. The method of claim 13, wherein arranging the one or more extents comprises relocating extents within the multi-tiered data storage based on the activity level associated with the one or more extents.

17. The method of claim 16, further comprising arranging high activity extents in the one or more extents in the one or more faster data tiers and low activity extents in the one or more extents in the one or more slower data tiers.

18. The method of claim 16, further comprising switching the direction of replication after the data relocator module has relocated the extents with the multi-tiered data storage based on the activity level associated with the extents.

19. The method of claim 17, further comprising moving extents that have a high activity level due to read operations to the one or more faster data tiers.

20. A computer program product comprising a computer-readable storage medium including program instructions embodied therewith, the program instructions executable by a processor to cause the processor to:
- detect a path change in a plurality of paths, the plurality of paths communicatively couple a host device to a plurality of volumes, wherein data is replicated from a pre-change primary volume in the plurality of volumes to a post-change primary volume in the plurality of volumes;
- switch a direction of replication in response to the detected path change, wherein data is replicated from the post-change primary volume to the pre-change primary volume in response to the detected path change;
- determine an activity level associated with one or more extents; and
- arrange the one or more extents on the post-change primary volume in response to the detected path change.

* * * * *